United States Patent
Hu et al.

(10) Patent No.: US 8,538,933 B1
(45) Date of Patent: Sep. 17, 2013

(54) DEDUPLICATING RANGE OF DATA BLOCKS

(75) Inventors: Ying Hu, Northborough, MA (US);
Richard P. Ruef, Santa Cruz, CA (US)

(73) Assignee: EMC Corporation, Hopkinton, MA (US)

( * ) Notice: Subject to any disclaimer, the term of this patent is extended or adjusted under 35 U.S.C. 154(b) by 233 days.

(21) Appl. No.: 13/073,868

(22) Filed: Mar. 28, 2011

(51) Int. Cl.
*G06F 7/00* (2006.01)
*G06F 17/00* (2006.01)

(52) U.S. Cl.
CPC .. *G06F 7/00* (2013.01); *G06F 17/00* (2013.01)
USPC .............................. 707/692; 707/694; 707/700

(58) Field of Classification Search
None
See application file for complete search history.

(56) References Cited

U.S. PATENT DOCUMENTS

| | | | |
|---|---|---|---|
| 2009/0204649 A1* | 8/2009 | Wong et al. | 707/204 |
| 2009/0204650 A1* | 8/2009 | Wong et al. | 707/204 |
| 2009/0265399 A1* | 10/2009 | Cannon et al. | 707/205 |
| 2009/0327625 A1* | 12/2009 | Jaquette et al. | 707/205 |
| 2010/0121825 A1* | 5/2010 | Bates et al. | 707/692 |
| 2010/0198797 A1* | 8/2010 | Wideman | 707/692 |

* cited by examiner

*Primary Examiner* — Jay Morrison
(74) *Attorney, Agent, or Firm* — Krishnendu Gupta; Jason A. Reyes; Deepika Bhayana (57) ABSTRACT

A method is used in deduplicating ranges of data blocks. A collection of data is selected from a set of storage extents. The collection of data is selected based on evaluation of digest information for a subset of the collection of data. A deduplicating technique is applied to the collection of data.

20 Claims, 8 Drawing Sheets

DEDUPLICATING RANGE OF DATA BLOCKS

BACKGROUND

1. Technical Field

This application relates to deduplicating ranges of data blocks.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data deduplication (also referred to simply as "deduplication") is a space-saving technology intended to eliminate redundant (duplicate) data (such as, files) on a data storage system. By saving only one instance of a file, disk space can be significantly reduced. For example, if a file of size 10 megabytes (MB) is stored in ten folders of each employee in an organization that has ten employees. Thus, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file does not constitute an entirely new file.

While deduplication systems have helped make data management much easier, they also come with a number of challenges.

SUMMARY OF THE INVENTION

A method is used in deduplicating ranges of data blocks. A collection of data is selected from a set of storage extents. The collection of data is selected based on evaluation of digest information for a subset of the collection of data. A deduplicating technique is applied to the collection of data.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in deduplicating ranges of data blocks, which technique may be used to provide, among other things, selecting a collection of data based on evaluation of digest information for a subset of the collection of data and applying deduplication technique to the collection of data.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. The size of this index table determines a window of deduplication opportunity. The larger the index table, the more blocks can be checked for duplicates, and thus the larger the opportunity for deduplication. However, a large index table consumes more storage resources and memory of the storage system. Therefore, given a limited amount of memory and/or storage resources, in at least some systems, it is impractical for every block of the storage system to be selected and information for that block stored in an index table. A goal is to store digest information for a subset of data blocks that may indicate high probability of finding range of duplicate data blocks and to apply a deduplicating technique to the range of data blocks based on digest information for the subset of data blocks stored in the index table.

Further, deduplicating systems process large set of data in order to find duplicate data blocks for deduplication. The processing of the large set of data by deduplication systems may consume a significant amount of storage resources and CPU processing. A goal is to reduce the size of the set of data processed by deduplication systems to decrease utilization of resources of a data storage system and increase performance of the data storage system.

In at least one storage system implementation as described below, deduplicating ranges of data blocks includes selecting a collection of data blocks for data deduplication processing based on digest information for a subset of the collection of data blocks, such that the collection of data blocks may be deduplicated without storing digest information for every data block in the collection of data blocks.

Conventionally, data deduplication for feature software requires that data blocks in a storage extent be iterated and processed for deduplication from beginning to end. A set of storage extents that are deduplicated together form a deduplication domain. As a result, in a conventional system, every data block of each storage extent in the deduplication domain is iterated through according to a specific iteration scheme. During this process, an index table of unique digests is created from the blocks that are iterated through. Thus, conventionally in such a case, in order for the system to perform data deduplication across multiple storage extents within a deduplication domain, the digest index table must be large enough to index all the unique blocks within a storage extent plus additional blocks in the next storage extent. Thus, a large digest index table in such conventional system consumes a large amount of storage resources. Further, iterating over a large set of data takes more time, thus increasing the possibility that by the time possible duplicate data is found, original data might have become stale or changed.

By contrast, in at least some implementations in accordance with the technique as described herein, the use of the deduplicating range of data blocks technique can provide one or more of the following advantages: lowering costs by improving deduplication efficiency, improving memory utilization by reducing the index table size, improving deduplication performance by storing digest for only a subset of a collection of data blocks, minimizing overhead for deduplication processing by processing range of data blocks for deduplication and reducing the amount of storage required for data deduplication by storing digest information for only a subset of data blocks in the index table based on evaluation of digest information of data blocks.

Figure 1:
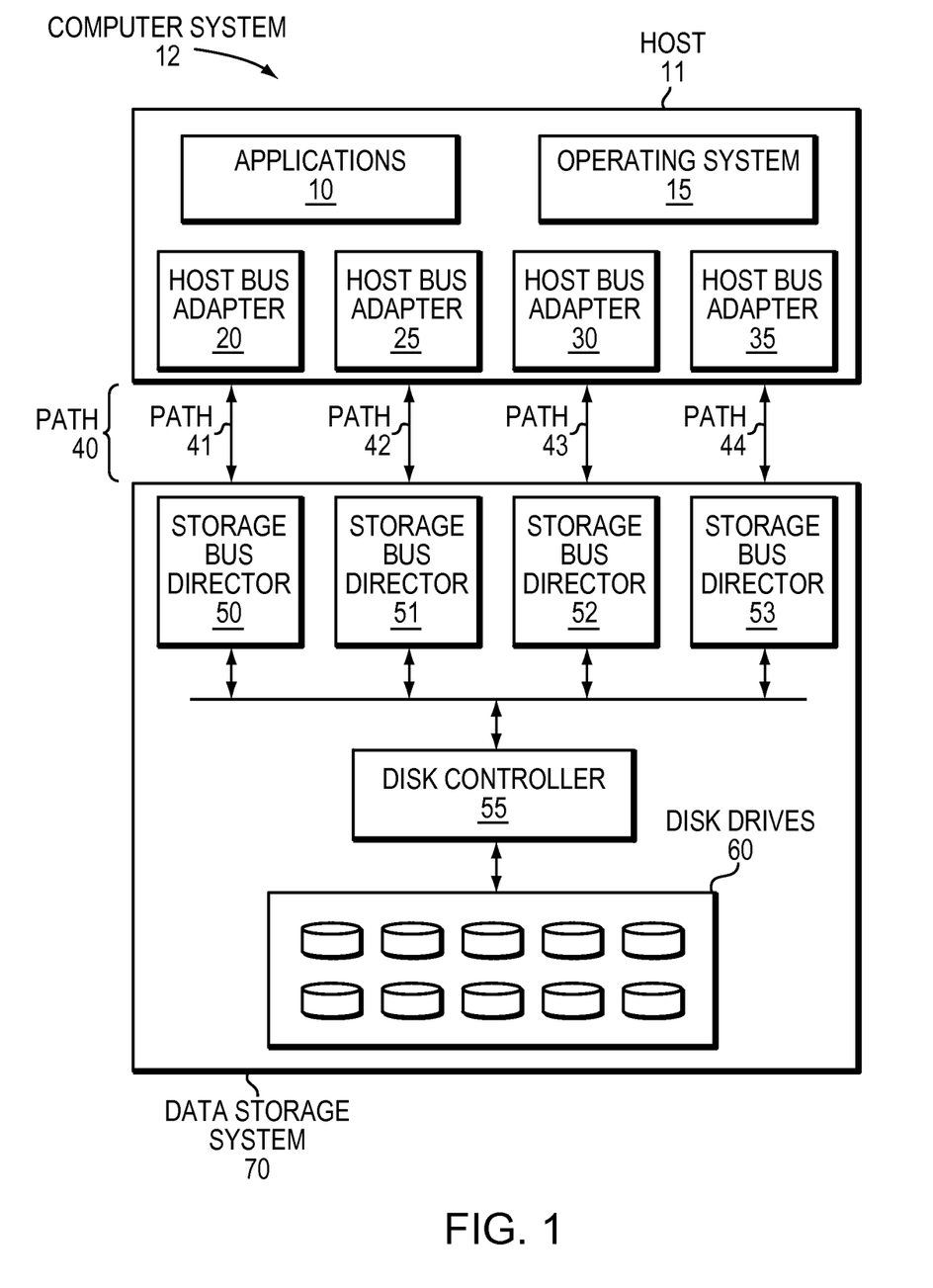
FIG. 1 is an example of an embodiment of a computer system that may utilize the techniques described herein.

Referring to FIG. 1, shown is an example of an embodiment of a computer system that may be used in connection with performing the techniques described herein. A computer system may include multiple hosts and multiple data storage systems in such a way that each host may access data on each of data storage systems. For simplicity, however, FIG. 1 illustrates a computer system 12 that includes a single host 11 and a single data storage system 70. Applications 10 running on operating system 15 of host 11 may access data in data storage system 70 via I/O driver and host bus adapters 20, 25, 30, and 35. Host 11 can be, for example, a server, a personal computer, or any other devices capable of initiating read and write requests to data storage system 70. Data storage system 70 can be a single physical data storage device or a data storage system comprising multiple physical data storage devices including an enterprise storage system. In computer system, consistent with the principles of the invention, there may be a plurality of data storage systems 70 accessible by host 11 and each data storage system may be unique.

Host 11 has multiple paths 40 for sending I/O requests to data storage system 70. Typically, there are at least two paths from a host to a data storage system. FIG. 1 shows four paths from host 11 to data storage system 70: path 41, path 42, path 43, and path 44. Each of the paths 40 can be any of a number of different types of communication links that allow data to be passed between data storage system 70 and host 11. Each of the host bus adapters 20, 25, 30, and 35 would be adapted to communicate using an appropriate protocol via the paths 40 with the storage bus directors 50, 51, 52 and 53. For example, path 40 can be implemented as a SCSI bus with host bus adapters 20 and storage bus director 50 each being a SCSI driver. Alternatively, path 40 between the host 11 and the data storage subsystem 70 may be a Fibre Channel fabric. Moreover, a path 40 may include multiple communication path types and may be part of a communication network.

In this embodiment of the computer system 12, the host 11 may access the data storage systems 70, for example, in performing input/output (I/O) operations, data requests, and other operations. The host 11 may perform different types of data operations in accordance with different types of tasks. The communication medium, path 40, may be any one or more of a variety of networks or other type of communication connections as known to those skilled in the art. Each of the paths 41-44 may be a network connection, bus, and/or other type of data link, such as a hardwire or other connections known in the art. The processors included in the host computer systems 11 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 70 are described herein in more detail, and may vary with each particular embodiment. The host 11 and data storage system 70 may all be located at the same physical site, or, alternatively, may also be located in different physical locations.

Storage bus directors 50, 51, 52 and 53 further communicates with the disk controller 55 to access data stored on the disk drives 60. The disk controller 55 may be configured to perform data storage operations on behalf of the host 11. Host system 11 may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single data storage system may be accessed by multiple hosts allowing the hosts to share the data residing therein. An LV or LUN (logical unit number) may be used to refer to the foregoing logically defined devices or volumes.

Figure 2:
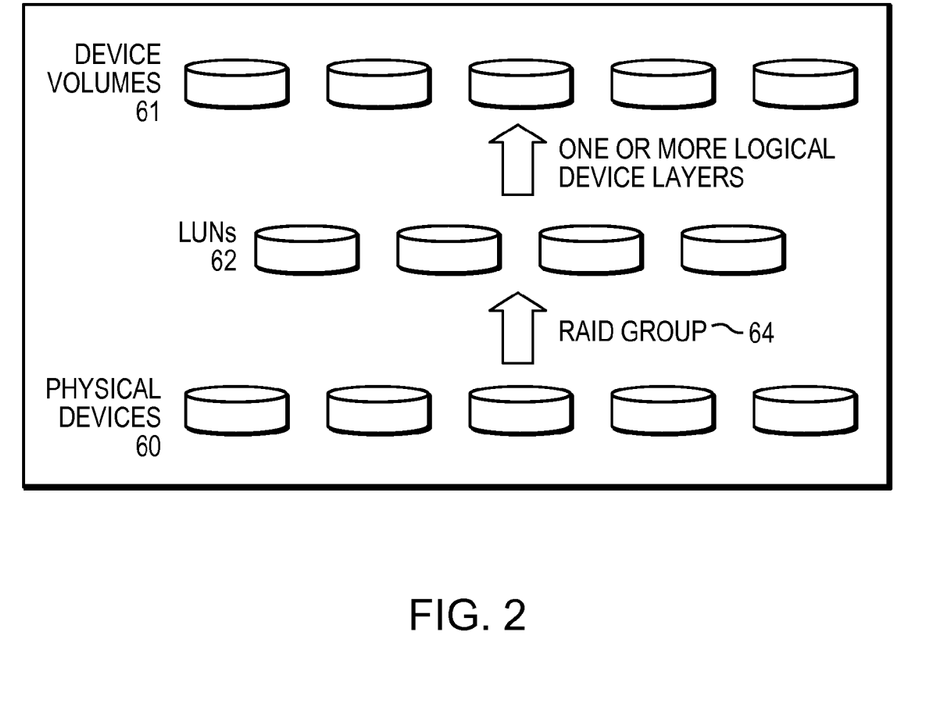
FIG. 2 is an example illustrating storage device layout.

FIG. 2 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consisting of a set of storage extents includes a set of deduplicated LUNs sharing a common set of blocks.

In another embodiment, the data storage subsystem 70 may include one or more data storage systems such as one or more of the data storage systems offered by EMC Corporation of Hopkinton, Mass. The data storage system may also include one or more data storage devices, such as disks. One or more data storage subsystems may be manufactured by one or more different vendors. Each of the data storage systems may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 70. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 70 of FIG. 1 is implemented using one or more data storage systems, each of the data storage systems may include code thereon for performing the techniques as described herein. In following paragraphs, reference may be made to a particular embodiment such as, for example, an embodiment in which element 70 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

As will be appreciated by those skilled in the art, the data storage system 70 may also include other components than as described for purposes of illustrating the techniques herein.

Figure 3:
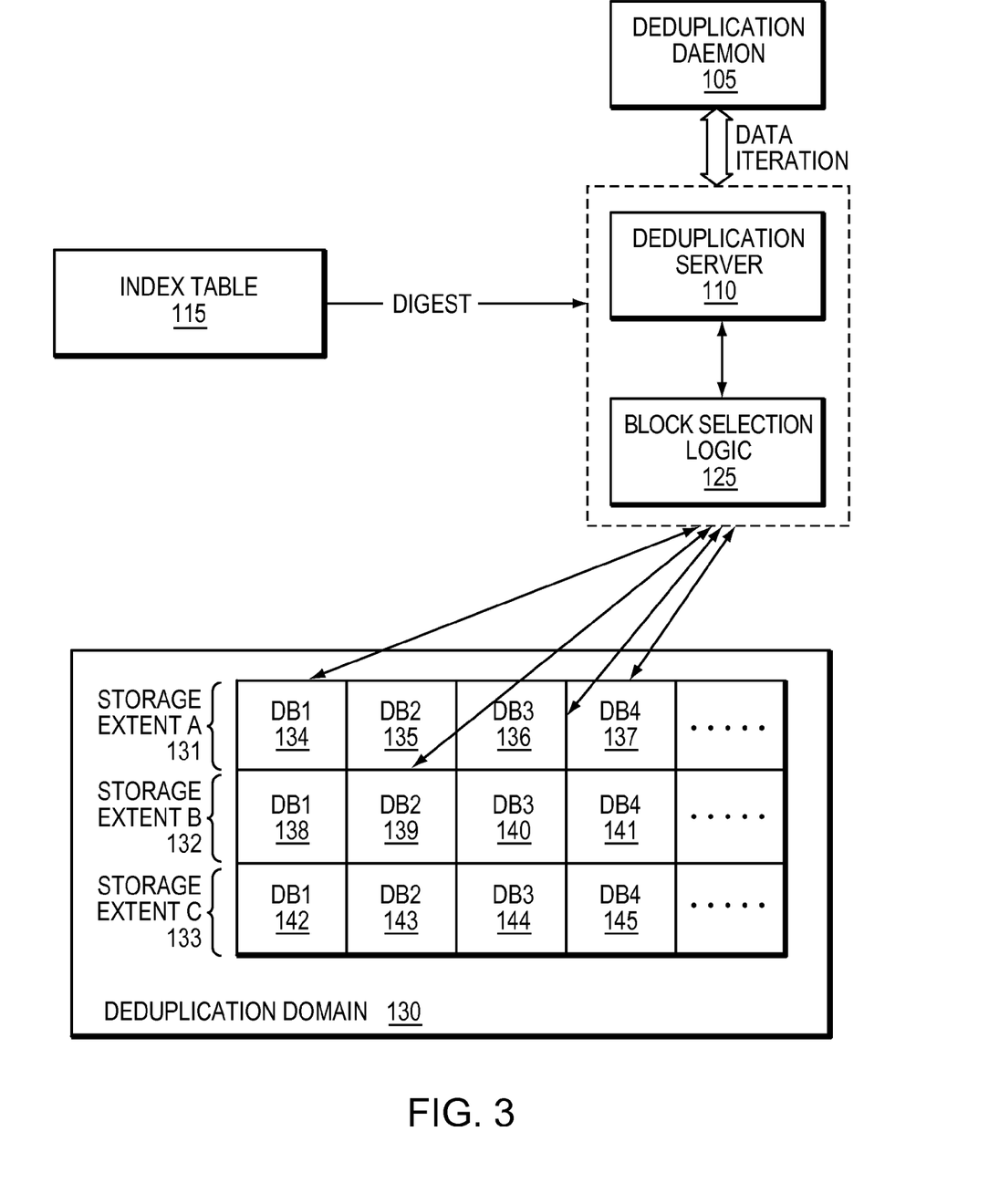
FIG. 3 is a diagram illustrating in more detail components that may be used in connection with techniques herein.

Referring to FIG. 3, shown is a more detailed representation of components that may be included in an embodiment using the techniques described herein. In a deduplication domain, each storage extent contains a range of data blocks. For example, in FIG. 3, storage extent A 131, storage extent B 132 and storage extent C 133 are part of the deduplication domain 130. Within a data storage system 70, there may be multiple deduplication domains. Within a deduplication domain, a goal of a deduplication process is to maintain only a single copy of each unique set of data. Software or other logic executing the deduplication process examines data in the deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block. For example, in FIG. 3, storage extent A 131 includes data blocks 134-137, storage extent B 132 includes data blocks 138-141 and storage extent C 131 includes data blocks 142-145 and other data blocks (not shown).

In at least one embodiment of the current technique, deduplication server 110 is a component that provides services to deduplication daemon 105 to iterate over sets of data in a deduplication domain 130. Deduplication server 110 also computes digests and remaps blocks after the deduplication technique is applied to remove duplicate blocks of data. Deduplication daemon 105 maintains a deduplication database (e.g. an index table) for a deduplication domain 130. Deduplication daemon 105 communicates with the deduplication server 110 to iterate through deduplication domain 130 and computes digests for the data blocks that are iterated through. A digest is created for each chunk of data that is iterated. Deduplication daemon 105 detects potential duplicate copies of data during the iteration and issues a request to the deduplication server 110 to deduplicate the data. The deduplication database is stored on one of the storage extents that include one or more LUNs. Deduplication daemon 105 also maintains an index table 115 on a LUN located in the same pool as the deduplication domain 130. In at least some implementations, an index table is a persistent hash-table of chunk-IDs keyed by the digest of the data stored in the chunk. The index table need not contain entries for every data chunk in the deduplication domain, but the effectiveness of deduplication is a function of the number of entries stored in the index table 115. The more entries in the index table, the more likely that duplicate blocks will be detected during the iteration. To accommodate more entries, the index table requires more memory and storage resources. Additionally, if the amount of storage used by the user is in terabytes, it can take days to iterate over the chunks of data for such a large address space of the storage. In at least one embodiment, use of the current technique enables deduplication daemon 105 to store in the index table digest information for only a subset of a collection of data blocks, such that remaining data blocks from the collection of data blocks may be processed for deduplication without storing digest information for those remaining data blocks. Thus, in at least one embodiment of the current technique, the index table does not include digests for all of the data inside all of the storage in the deduplication domain. In at least one embodiment, deduplication server 110 iterates over a set of data blocks sequentially. Deduplication server 110 interacts with block selection logic 125 to identify and select a data block for storing the digest of the data block in the index table. Block selection logic 125 evaluates the digest of a data block and stores the digest of the data block in the index table if the digest matches a specific criterion. Thus, if digest information for a subset of data blocks included in a deduplication domain matches the specific criterion, the index table stores digest entries for the subset of data blocks. When digest entries stored in the index table are processed for deduplication, data storage system 70, upon finding two pairs of matching digest entries, attempts to deduplicate a set of data blocks that exists between the two pairs of matching digest entries if the number of data blocks between data blocks associated with the two pairs of matching digest entries can be determined by data storage system 70. Further, in at least one embodiment, if the number of data blocks between data blocks associated with the two pairs of matching digest entries is greater than a pre-defined threshold, the data blocks between the two pairs of matching digest entries are not deduplicated. Instead, only the data blocks associated with the two matching pair of digest entries are deduplicated. Thus, in at least one embodiment, data storage system 70 may attempt to deduplicate a set of data blocks even when digest information for the entire set of data blocks is not stored in the index table. In at least some cases, when processing the set of data blocks for deduplication, there is a low probability that data storage system 70 may not be able to deduplicate every data block of the set of data blocks successfully and a deduplication request may result into a false deduplication request. In at least one embodiment of the current technique, data storage system 70 keeps track of false deduplication requests and when the total number of false deduplication requests reaches a certain threshold, data storage system 70 adjusts the specific criteria for storing digest of a data block in the index table. If data storage system 70 encounters a high number of false deduplication requests, data storage system 70 adjusts the specific criteria for storing the digest of a data block in the index table in such a way that data storage system 70 stores more number of digest entries in the index table. If data storage system 70 encounters a low number of false deduplication requests, data storage system 70 adjusts the specific criteria for storing digest of a data block in the index table in such a way that data storage system 70 stores fewer digest entries in the index table. Further, the pre-defined threshold that determines whether the data blocks between the two pairs of matching digest entries may be processed for deduplication may be changed to a different value based on the number of false deduplication requests processed by data storage system 70. It should be noted that the pre-defined threshold may be changed to a different value if needed based on one or more factors that may help improve efficiency of deduplication.

It should be noted that block selection logic 125 may also be included as part of deduplication server 110. Further, it should be noted that block selection logic 125 may also be included as part of any other component in an embodiment.

Figure 4:
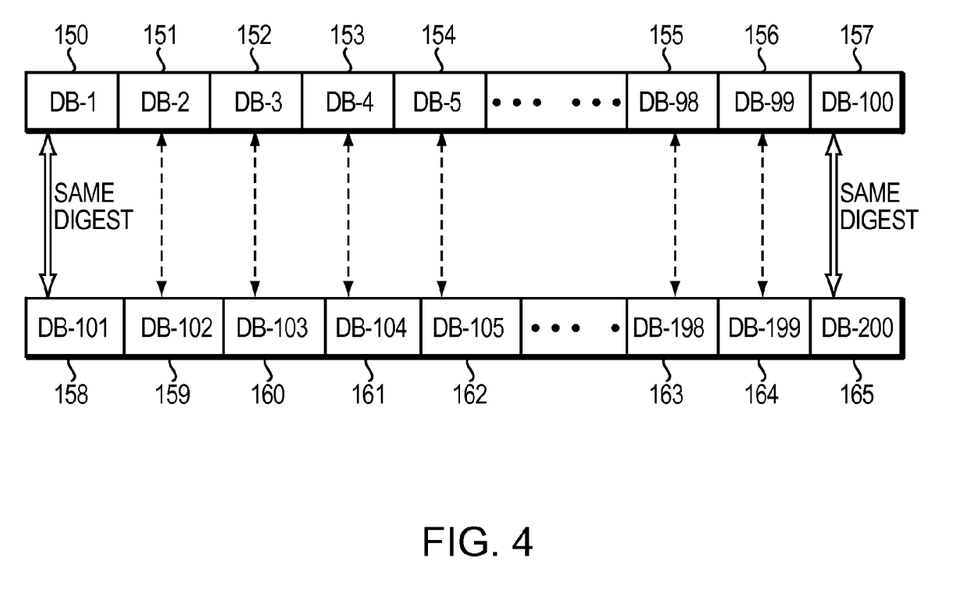
FIG. 4 is an example illustrating selection of data across a set of storage extents.

Referring to FIG. 4, shown is one example of selection of a subset of a collection of data blocks that may be included in an embodiment using the techniques described herein. A goal of deduplicating range of data blocks in accordance with the current technique is to find duplicate blocks faster by storing digest information for a subset of data blocks in a deduplication domain instead of storing digest information for each data block in the deduplication domain. In at least one embodiment of the current technique, a digest is a 64 bit number. Further, in at least one embodiment of the current technique, the specific criteria for evaluating digest information of a data block includes an adjustable parameter "numberOfEndingZeroBits". The value of the adjustable parameter indicates least number of zero bits a digest may have at the end. For example, in at least one embodiment of the current technique, the value of the adjustable parameter may be 3 indicating that if the digest of a data block has at least three zeros at the end, the digest of the data block is stored in the index table, and that if the digest of the data block does not have at least three zeros at the end, the digest of the data block is not stored in the index table. Thus, in such an embodiment of the current technique, on an average digest information for one-eighth of the total number of data blocks in a deduplication domain is stored in the index table. For example, in FIG. 4, deduplication daemon 105 iterates data blocks DB-1 to DB-200 for deduplication processing. For each data block, deduplication daemon 105 computes a digest and evaluates the digest to determine whether the digest meets the specific criteria of numberOfEndingZeroBits indicating least number of zeros that must exist at the end of a bit representation of the digest. For example, in FIG. 4, digest for data block DB-1 150 ends with three zeros and thus, digest information for data block DB-1 150 is stored in the index table. Digest for data blocks DB-2 151, DB-3 152, DB-4 153, DB-5 154, DB-98 155, and DB-99 156 (and other data blocks between data blocks DB-5 155 and DB-98 155 that are not shown) does not end with three zeros. Thus, digest entries for data blocks DB-2 151 to DB-99 156 are not stored in the index table. Digest for data block DB-100 157 includes three zeros at the end, thus the digest of data block DB-100 157 is stored in the index table. Similarly, digests for data blocks DB-101 158 and DB-200 165 includes three zero at the end and thus, digest entries for data blocks DB-101 158 and DB-200 165 are stored in the index table. Digest for data blocks DB-102 159, DB-103 160, DB-104 161, DB-105 162, DB-198 163, and DB-199 164 (and other data blocks between DB-105 162 and DB-198 163 that are not shown) does not end with three zeros. Thus, digest entries for data blocks DB-105 162 to DB-198 163 are not stored in the index table.

Deduplication daemon 105 finds data blocks that may be deduplicated by iterating over digest entries stored in the index table. Two or more data blocks that have same digest indicates that the data blocks are candidates for deduplication. For example, in FIG. 4, deduplication daemon 105 determines that digest for data blocks DB-1 150 and DB-101 158 is same indicating that data blocks DB-1 150 and DB-101 158 may be deduplicated. Deduplication daemon 105 also determines that digest for data blocks DB-100 157 and DB-200 165 is same indicating that data blocks DB-100 157 and DB-200 165 may also be deduplicated. In at least one implementation in accordance with the technique as described herein, if deduplication daemon 105 finds two matching pairs of digest entries in the index table, deduplication daemon 105 attempts to deduplicate range of data blocks that exist between the data blocks associated with the two matching pair of digest entries. In other words, if deduplication daemon 105 finds two collections of data blocks where digest of a first data block of the first collection of data blocks matches with the digest of a first data block of the second collection of data blocks (indicating a first matching pair of digest entries) and digest of a second data block of the first collection of data blocks matches with the digest of a second data block of the second collection of data blocks (indicating a second matching pair of digest entries), deduplication daemon 105 proceeds to attempt to deduplicate data blocks between the first and second data blocks of the first collection of data blocks with the data blocks between the first and second data blocks of the second collection of data blocks. However, in at least one embodiment, if the number of data blocks between the first data block and the second data block of the first collection of data blocks is not equal to the number of data blocks between the first data block and the second data block of the second collection, the data blocks between the two pairs of matching digest entries are not deduplicated. Instead, only the data blocks associated with the two matching pair of digest entries are deduplicated.

For example, in FIG. 4, the first matching pair of data blocks that may be deduplicated together is DB-1 150 and DB-101 158 and the second matching pair of data blocks that may be deduplicated together is DB-100 157 and DB-200 165. Thus, deduplication daemon 105 attempts to deduplicate data block DB-2 152 with data block DB-102 159, data block DB-3 153 with data block DB-103 160, data block DB-4 154 with data block DB-104 161, data block DB-5 155 with data block DB-105 162, data block DB-98 156 with data block DB-198 163, and data block DB-99 156 with data block DB-199 164. Deduplication daemon 105 issues a request to deduplicate each of the data block identified above. It may be possible that some of the deduplication request may fail and some of the data blocks may not be deduplicated to each other because they may not contain identical content. The failed deduplication requests are considered false deduplication requests. Data storage system 12 tracks the number of false deduplication requests and use that number as an indicator to adjust the specific criteria for evaluating digest information of a data block.

In at least one implementation, deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 115) that maintains a digest (e.g., SHA, checksum) for each block. When two blocks have the same digest they have a sufficiently high probability of containing the same data and may warrant a bit-for-bit comparison to confirm they are exact duplicates. Remapping leverages dynamic block-mapping technology of a filesystem driver included in the data storage system 70. A filesystem allows dynamic manipulation of the address maps that connects LUN's logical address space to its physical address space. The file system also allows mapping a single block of storage at multiple locations within the filesystem, and allows handling of writes to shared blocks by allocating new storage and updating the shared address mappings.

Figure 5:
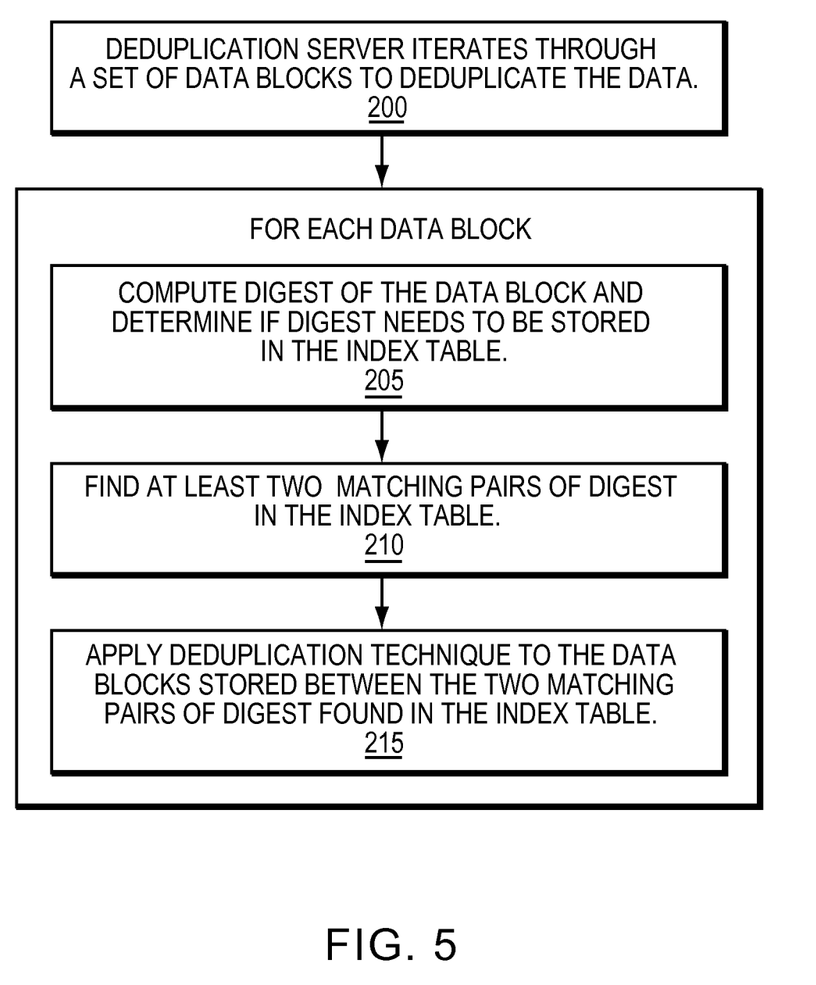
FIGS. 5-8 are flow diagrams illustrating processes that may be used in connection with techniques herein.

Referring to FIG. 5, shown is a flow diagram illustrating a flow of data in the data storage system. With reference also to FIG. 3, deduplication server 110 iterates through a set of data blocks in a deduplication domain based on an iteration scheme in order to deduplicate the set of data blocks (step 200). For each data block that is part of the iteration scheme, deduplication daemon 105 computes digest for the data block. Digest information of the data block is evaluated to determine whether the digest of the data block matches a specific criteria. If the digest of the data block matches the specific criteria, then the digest of the data block is stored in the index table 115 (step 205). Once the digest for the data block is stored in the index table 115, the digest is compared with other digest entries stored in the index table 115. If the digest of the data block matches with a digest entry in the index table, then the data block may be deduplicated with the data block associated with the matching digest entry from the index table 115. The digest of the data block and the matching digest entry from the index table is known as a matching pair of digest entry. If deduplication daemon 105 finds two or more matching pairs of digest entries in the index table 115 (step 210), deduplication technique is applied to data blocks stored between the data blocks associated with two matching pairs of digest entries (step 215). In other words, deduplication server 110 applies deduplicating processing to data blocks even when digest information for every data block is not stored in the index table 115.

Figure 6:
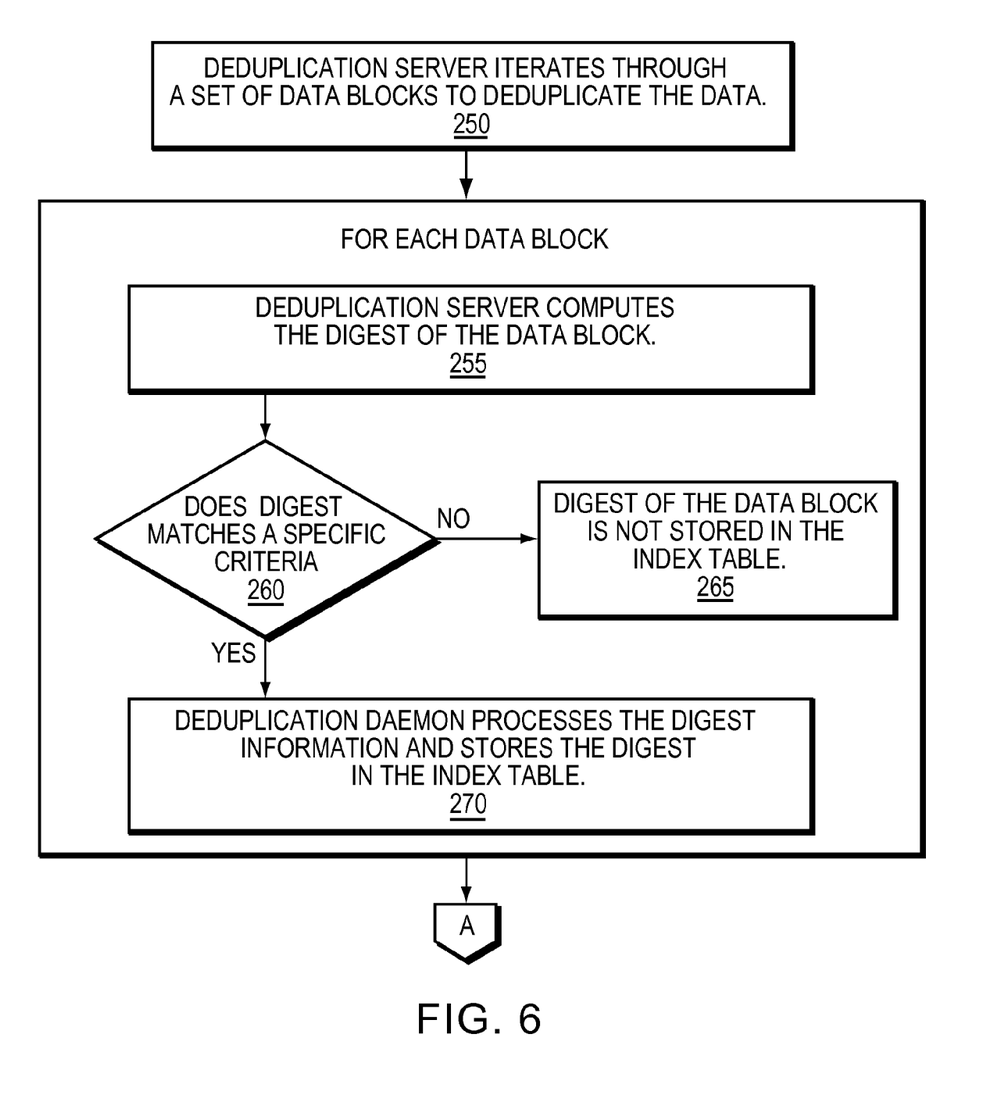
Figure 7:
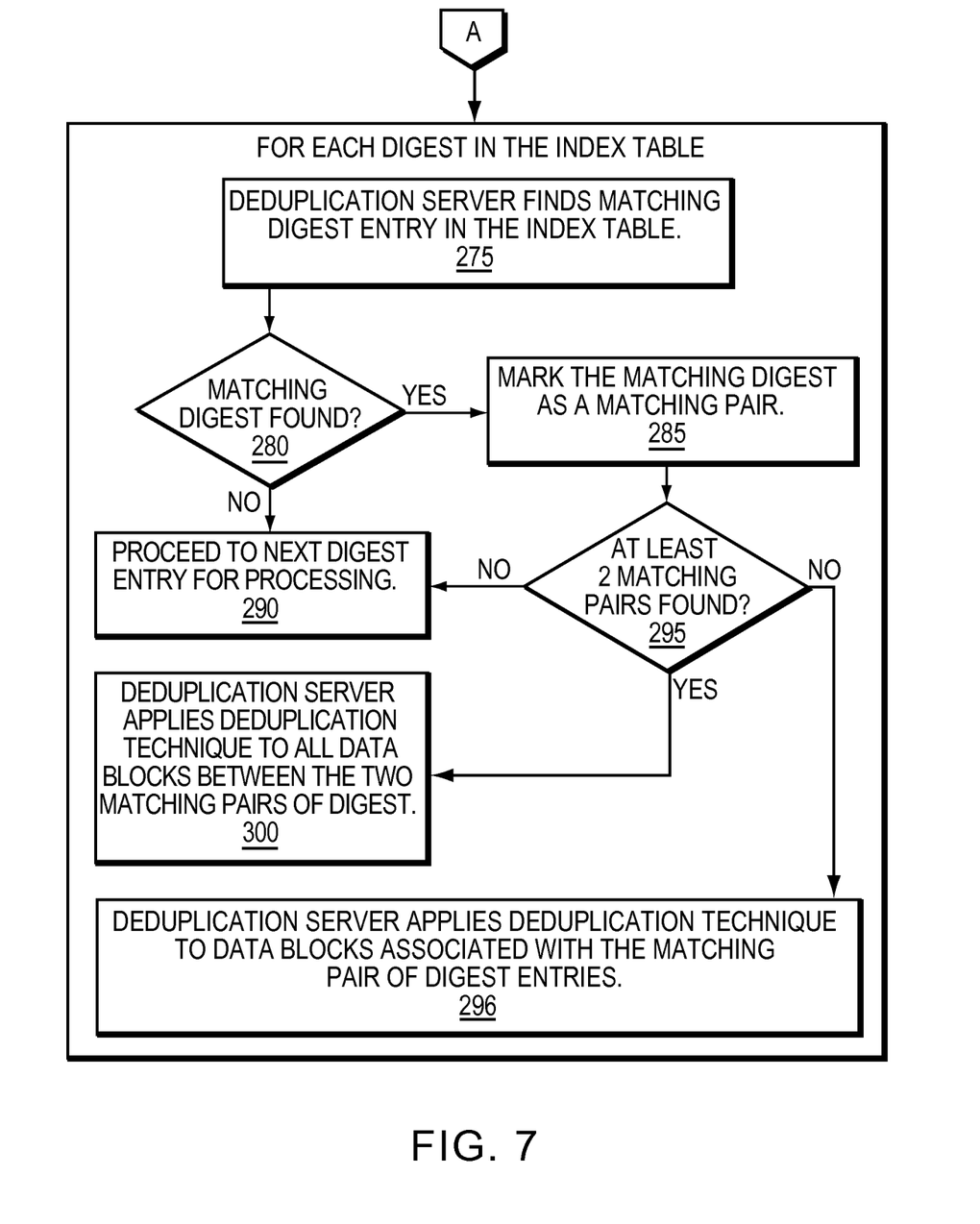

Referring to FIGS. 6 and 7, shown is a more detailed flow diagram illustrating a flow of data in the data storage system. Deduplication server 110 iterates through a set of data blocks in a deduplication domain in order to deduplicate the set of data blocks (step 250). For each data block that is part of the iteration, deduplication server 110 computes a digest for the data (step 255). In at least one embodiment, an adjustable parameter, numberOfEndingZeroBits, may be used as the specific criterion for evaluating whether the digest of the data block is stored in the index table 115. In at least one embodiment of the current technique, value of the adjustable parameter may be three indicating that at least last three bits of a digest must be zeros. The digest of the data block is evaluated based on the value of the adjustable parameter, numberO-fEndingZeroBits (step 260). If the digest of the data block includes at least as many zero bits in the end as specified by the adjustable parameter, then deduplication daemon 105 processes the digest and stores the digest in the index table (step 270). If the digest of the data block does not include at least as many zero bits in the end as specified by the adjustable parameter, then the digest is not stored in the index table 115 (step 265). This process repeats until every data block in the set of storage extents in deduplication domain 130 has been iterated through according to the iteration scheme.

It should be noted that the specific criterion for evaluating digest of a data block may be based on any of different patterns of a hash value that is based on a digest of a data block.

Referring to FIG. 7, deduplication daemon 105 iterates over digest entries stored in the index table 115 in order to find range of data blocks that may be deduplicated. For each digest entry in the index table 115, deduplication daemon 105 compares the digest entry with list of digest entries stored in the index table 115 (step 275). If a matching digest entry is found in the index table 115, deduplication daemon 105 marks the matching digest entry and the digest entry as a first matching pair of digest entries that may be deduplicated (step 285). Deduplication daemon 105 then proceeds to process next digest entry in the index table 115 (step 290). If a second digest entry matches with a digest entry in the index table 115, deduplication daemon 105 marks the second digest entry and the matching digest entry from the index table 115 as a second matching pair of digest entries that may be deduplicated (step 295). Upon finding at least two matching pairs of digest entries, deduplication daemon 105 sends a request to deduplication server 110 to deduplicate data blocks between the two matching pairs of digest entries (step 300). Data blocks stored on data storage system 12 between the first matching pair of digest entries is a first collection of data blocks that are deduplicated with a second collection of data blocks which are data blocks stored on data storage system 12 between the second matching pair of digest entries. If only one matching pair of digest entries is found in the index table 115, deduplication daemon 105 sends a request to deduplication server 110 to deduplicate two data blocks associated with the matching pair of digest entries (step 296).

Figure 8:
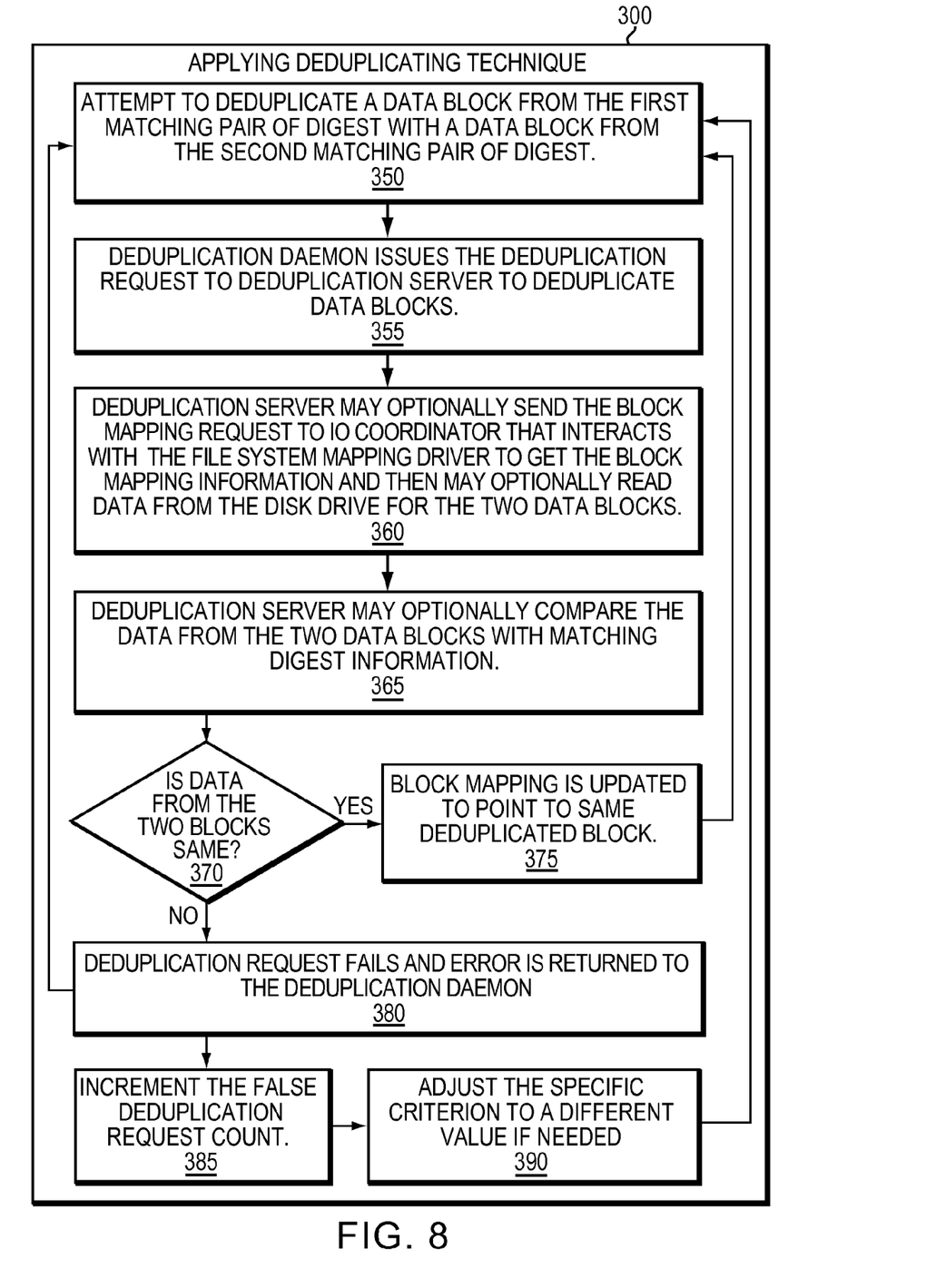

Referring now to FIG. 8 that illustrates a process of deduplicating two data blocks that have been identified by deduplication daemon 105 as duplicate data blocks during processing of a digest information. Deduplication daemon 105 issues a request to the deduplication server 110 to deduplicate a first data block from the first collection of data blocks and a first data block from the second collection of data blocks (step 350). Deduplication daemon 105 issues a request to the deduplication server 110 to deduplicate data blocks (step 355). Deduplication server 110 extracts filesystem information from the digest information of the first data block from the first collection of data blocks. Deduplication server 110 may optionally issue an IO request to an IO Coordinator component of data storage system 12. The IO Coordinator issues a mapping request to the file system mapping driver to find physical address of the first data block from the first collection of data blocks. If the mapping request completes successfully, the IO Coordinator may read the data from the first data block from the first collection of data blocks located at the physical address indicated by the mapping. The deduplication server 110 may optionally issue a read request for the first data block from the second collection of data blocks. The read request for the first data block from the second collection of data blocks is processed identically to the first read request (step 360). When the second read request completes, deduplication server 110 may optionally compares the data read from the first data block from the first collection of data blocks with the data read from the first data block from the second collection of data blocks (step 370). If the data of the first data block from the first collection of data blocks is not same as the data of the first data block from the second collection of data blocks, the request to deduplicate the data blocks fails and an error is returned back to the deduplication daemon 105 (step 380). If the data of the first data block from the first collection of data blocks is same as the data of the first data block from the second collection of data blocks, the IO Coordinator requests the file system mapping driver to deduplicate the two identical data blocks. If the data blocks are successfully deduplicated, the address mapping of the first data block from the first collection of data blocks is updated to point to a single copy of the data (i.e. the address map of the first data block from the first collection of data blocks now points to the address map of the first data block from the second collection of data blocks) (step 375). If the data blocks are not successfully deduplicated, a counter used to track a false deduplication request is incremented (step 385). If the counter reaches a certain threshold, value of the adjustable parameter, numberOfEndingZeroBits, is changed to a different value (step 390).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in deduplicating ranges of data blocks, the method comprising:
    determining a first data block from a first collection of data from a set of storage extents and a second data block from a second collection of data from the set of storage extents, wherein the first and second data blocks represents a first pair of data blocks for applying a deduplicating technique based on evaluation of digest information of the first and second data blocks;
    determining a third data block from the first collection of data and a fourth data block from the second collection of data, wherein the third and fourth data blocks represents a second pair of data blocks for applying the deduplicating technique based on evaluation of digest information of the third and fourth data blocks; and
    based on the determination, applying the deduplicating to a collection of data blocks residing between the first and second pairs of data blocks.

2. The method of claim 1, wherein each storage extent of the set of storage extents comprises a set of LUNs, wherein each LUN of the set of LUNs is a logical representation of a subset of a physical disk storage.

3. The method of claim 1, wherein a collection of data comprises a collection of data blocks, wherein the data block is a fixed size chunk of a physical disk storage.

4. The method of claim 1, wherein a digest is associated with a data block, wherein the digest is based on contents of the data block and uniquely identifies the data block.

5. The method of claim 1, wherein an index table comprises a set of index entries, wherein each index entry of the set of index entries is associated with a digest of a data block.

6. The method of claim 1, further comprising:
    computing a digest for each data block in a storage extent of the set of storage extents;
    comparing the digest for each data block in a storage extent of the set of storage extents with a pattern of data defined by a criterion, wherein the criterion is based on the digest of the data block; and
    based on the comparison, adding an index entry to an index table, wherein the index entry is associated with the digest.

7. The method of claim 1, wherein selecting a collection of data from a set of storage extents further comprising:
    comparing a first digest with one or more index entries of an index table;
    determining a first pair of matching digest entry, based on whether the first digest matches with an index entry of the index table;
    comparing a second digest with one or more index entries of an index table;
    determining a second pair of matching digest entry, based on whether the second digest matches with an index entry of the index table; and
    selecting data blocks between the first pair of matching digest entry and the second pair of matching digest entry for applying the deduplicating technique.

8. The method of claim 1, further comprising:
    selecting a first data block and a second data block from the collection of data from the set of storage extents;
    comparing contents of the first data block with contents of the second data block; and
    based on the comparison, applying the deduplicating technique to the first data block and the second data block.

9. The method of claim 1, wherein applying the deduplicating technique further comprising:
    updating an address mapping of a first data block to point to a second data block, wherein the first data block and the second data block contain same content of data, wherein the address mapping indicates a location of a data block on a disk storage; and
    deleting the content of the first data block from the disk storage.

10. The method of claim 1, further comprising:
    updating a counter based on application of the deduplicating technique to the collection of data; and
    updating a criteria for selecting the collection of data based on the counter.

11. A system for use in deduplicating ranges of data blocks, the system comprising a processor configured to:
    determine a first data block from a first collection of data from a set of storage extents and a second data block from a second collection of data from the set of storage extents, wherein the first and second data blocks represents a first pair of data blocks for applying a deduplicating technique based on evaluation of digest information of the first and second data blocks;
    determine a third data block from the first collection of data and a fourth data block from the second collection of data, wherein the third and fourth data blocks represents a second pair of data blocks for applying the deduplicating technique based on evaluation of digest information of the third and fourth data blocks; and
    based on the determination, apply the deduplicating to a collection of data blocks residing between the first and second pairs of data blocks.

12. The system of claim 11, wherein each storage extent of the set of storage extents comprises a set of LUNs, wherein each LUN of the set of LUNs is a logical representation of a subset of a physical disk storage.

13. The system of claim 11, wherein a collection of data comprises a collection of data blocks, wherein the data block is a fixed size chunk of a physical disk storage.

14. The system of claim 11, wherein a digest is associated with a data block, wherein the digest is based on contents of the data block and uniquely identifies the data block.

15. The system of claim 11, wherein an index table comprises a set of index entries, wherein each index entry of the set of index entries is associated with a digest of a data block.

16. The system of claim 11, further comprising:
computing a digest for each data block in a storage extent of the set of storage extents;
comparing the digest for each data block in a storage extent of the set of storage extents with a pattern of data defined by a criterion, wherein the criterion is based on the digest of the data block; and
adding, based on the comparison, an index entry to an index table, wherein the index entry is associated with the digest.

17. The system of claim 11, wherein selecting a collection of data from a set of storage extents further comprising:
comparing a first digest with one or more index entries of an index table;
determining a first pair of matching digest entry, based on whether the first digest matches with an index entry of the index table;
comparing a second digest with one or more index entries of an index table;
determining a second pair of matching digest entry, based on whether the second digest matches with an index entry of the index table; and
selecting data blocks between the first pair of matching digest entry and the second pair of matching digest entry for applying the deduplicating technique.

18. The system of claim 11, further comprising:
selecting a first data block and a second data block from the collection of data from the set of storage extents;
comparing contents of the first data block with contents of the second data block; and
applying, based on the comparison, the deduplicating technique to the first data block and the second data block.

19. The system of claim 11, wherein applying the deduplicating technique further comprising:
updating an address mapping of a first data block to point to a second data block, wherein the first data block and the second data block contain same content of data, wherein the address mapping indicates a location of a data block on a disk storage; and
deleting the content of the first data block from the disk storage.

20. The system of claim 11, further comprising:
updating a counter based on application of the deduplicating technique to the collection of data; and
updating a criteria for selecting the collection of data based on the counter.

* * * * *